United States Patent [19]

Schill

[11] Patent Number: 4,466,344
[45] Date of Patent: Aug. 21, 1984

[54] MACHINE FOR SKINNING BACON OR THE LIKE

[75] Inventor: Hermann Schill, Kehl, Fed. Rep. of Germany

[73] Assignee: Maja-Maschinenfabrik Hermann Schill GmbH, Kehl-Goldscheuer, Fed. Rep. of Germany

[21] Appl. No.: 487,579

[22] Filed: Apr. 22, 1983

[30] Foreign Application Priority Data

Apr. 30, 1982 [DE] Fed. Rep. of Germany ....... 3216150

[51] Int. Cl.³ .............................................. A22C 17/12
[52] U.S. Cl. .......................................... 99/589; 17/21; 17/62; 99/595; 99/599
[58] Field of Search .................................. 99/584–590, 99/596, 540, 541, 489–492, 486; 17/21, 24, 50, 52, 62; 83/874, 868, 648, 544, DIG. 1

[56] References Cited

U.S. PATENT DOCUMENTS

| 3,742,841 | 7/1973 | Beasley | 99/589 |
| 3,769,903 | 11/1973 | Greider | 99/589 |
| 3,858,502 | 1/1975 | Townsend | 99/589 |
| 4,408,519 | 10/1983 | Schill | 99/596 X |

Primary Examiner—Timothy F. Simone
Attorney, Agent, or Firm—Peter K. Kontler

[57] ABSTRACT

A bacon skinning machine wherein the knife is movable with reference to the traction wheel by a support having two arms which carry the knife holder. The arms are movable lengthwise and are pivotable by two eccentrics mounted on a shaft which is rotatable by a single lever. The lever can move the support to a position in which the holder and the knife can be detached from the arms, to a position in which the holder automatically conforms its position to the thickness of the rind on a slab of bacon, and a starting position. The arms are biased in a direction to urge the knife toward the periphery of the traction wheel, and such arms engage pivot pins in the machine frame in that position of the support when the holder can be detached from the arms. The holder has extensions which carry roller followers serving a track stationary cams in the frame when the arms are disengaged from the pivot pins and the knife is in a position to select its distance from the traction wheel as a function of the thickness of the rind.

25 Claims, 6 Drawing Figures

MACHINE FOR SKINNING BACON OR THE LIKE

BACKGROUND OF THE INVENTION

The present invention relates to improvements in machines for cutting or slicing bacon or the like, especially to improvements in machines for removing rinds from slabs of bacon. More particularly, the invention relates to improvements in machines of the type wherein the product which is to be relieved of the rind and/or otherwise comminuted is fed into the range of the cutting edge of an adjustable knife by a driven wheel or an analogous traction device.

A skinning machine for bacon, fish and like products with an adjustable knife is disclosed in the commonly owned copending patent application Ser. No. 266,095 filed May 21, 1981 for "Apparatus for slicing bacon or the like", now U.S. Pat. No. 4,408,519 granted Oct. 11, 1983. Other slicing or skinning machines which embody or can employ adjustable knives are disclosed in the commonly owned U.S. Pat. No. 4,123,959 granted Nov. 7, 1978 and in the commonly owned U.S. Pat. No. 4,188,870 granted Feb. 19, 1980.

In presently known skinning or slicing machines for bacon or like products, especially in skinning machines wherein successive slabs of bacon are relieved of rinds by the cutting edge of an adjustable knife which is mounted in or on a holder adjacent to a rotary traction wheel, the holder for the knife is connected with adjusting means portions of which are accessible at the exterior of the housing or frame of the machine and are actuatable to move the knife between an operative position as well as a retracted position in which the knife can be removed from the machine. In certain types of such machines, the knife is further movable to an intermediate position, especially for the removal of the rind, in which its cutting edge is located at a variable distance from the periphery of the traction wheel. Means is provided to bias the knife in a direction toward the traction wheel; this enables the knife to automatically assume an optimum position for removal of the rind from a slab of bacon or the like, i.e., the width of the gap between the cutting edge of the knife and the periphery of the traction wheel is a function of the thickness of the rind and the width of such gap varies in response to changes in the thickness of successive increments of the rind while the slab, which is to be relieved of the rind, is caused to advance through the machine.

A drawback of heretofore known slicing or skinning machines is that the manipulation of the knife from the exterior of the machine frame is rather complex and often confusing, especially to semiskilled or unskilled persons. Moreover, the mechanism for adjusting the knife with reference to the traction wheel (i.e., with reference to the path of movement of slabs of bacon or the like through the machine) is rather bulky, complex and expensive. In many instances, the adjusting means comprises several levers so that the manipulation of such adjusting means by a semiskilled, unskilled or careless person is likely to cause serious injuries (e.g., as a result of reaching into the frame at a time when the knife is set for slicing or skinning of slabs of bacon or the like), damage to parts of the machine, unsatisfactory treatment of slabs and/or prolonged delays with attendant losses in output.

Another drawback of certain presently known slicing or skinning machines is that the knife can be moved to a selected position only by moving it through numerous additional positions, i.e., that the movement of the knife to a selected position cannot be effected at will but only by causing the knife to move through several additional positions prior to reaching the desired or optimum position. For example, if the machine comprises a first lever which must be pivoted to a certain angular position in order to ensure that the knife is ready for removal from the machine frame, a second lever which is used to select the thickness of the rind that is to be separated from one side of a slab must be moved to a predetermined position before the first lever can be actuated with a view to allow for extraction of the knife or vice versa.

OBJECTS AND SUMMARY OF THE INVENTION

An object of the invention is to provide a novel and improved slicing or skinning machine for slabs of bacon, fish or the like which is constructed and assembled in such a way that the manipulation of the knife from the outside of the machine frame is simpler, safer and takes up less time than in heretofore known machines.

Another object of the invention is to provide novel and improved means for moving the adjustable knife of a slicing or skinning machine between a plurality of different positions.

A further object of the invention is to provide a simple, compact and inexpensive but highly reliable adjusting mechanism for the knife of a bacon slicing or skinning machine.

An additional object of the invention is to provide a knife adjusting mechanism which can be installed in certain presently known slicing or skinning machines with a minimum of modifications in the construction and/or mode of operation of such machines.

Still another object of the invention is to provide novel and improved means for maintaining the knife of a slicing or skinning machine for foodstuffs or the like in one or more selected positions.

Another object of the invention is to provide a bacon skinning or slicing machine whose versatility exceeds that of heretofore known machines, at least insofar as the adjustments of the knife with reference to the traction device are concerned.

An additional object of the invention is to provide a novel and improved method of manipulating the knife in a machine which serves to remove the rinds from slabs of bacon, from fish or from other types of foodstuffs.

Another object of the invention is to provide a machine of the above outlined character wherein the manipulation of the knife is simpler and safer than in conventional machines.

An ancillary object of the invention is to provide the adjusting mechanism for the knife of a slicing or skinning machine with novel and improved means for manually selecting the position of the knife with reference to the path of movement of products through the machine.

The invention is embodied in a machine for skinning or slicing slabs of bacon or analogous products. The machine comprises a frame or housing, a support which is mounted in the frame and includes a knife holder, a traction device which is movably mounted in the frame and serves to advance products into the range of the knife which is carried by the holder, means for adjusting the position of the support with reference to the traction device including first and second abutment means provided in the frame and displacing means which is actuatable to move the support with reference to the frame between at least one first position in which the support engages or is close to the first abutment means and at least one second position in which the support engages the second abutment means, and means for yieldably biasing the knife in the holder toward the traction device through the medium of the support. The adjusting means further comprises a lever, a handwheel or another suitable member which is turnable with reference to the frame to thereby actuate the displacing means.

The support preferably further comprises at least one elongated arm for the holder. This arm is movable lengthwise and is also pivotable with reference to the first abutment means in response to actuation of the displacing means. The arm or arms detachably support the holder, and the displacing means preferably comprises at least one eccentric which is rotatable by the lever or handwheel with reference to the frame to thereby move the arm or arms and the holder to the first and second positions. The displacing means preferably comprises a discrete eccentric for each arm of the support and the aforementioned lever or handwheel can be manipulated by hand from the exterior of the frame to rotate the eccentrics about a common axis.

The traction device preferably comprises a serrated traction wheel and an electric motor or other suitable means for rotating the traction wheel relative to the frame. The arm or arms of the support preferably extend substantially tangentially of the traction wheel and have portions which are adjacent to the traction wheel; such portions of the arms are provided with sockets and the holder is provided with bolts or other suitable male coupling members which are detachably received in the sockets of the arms. These sockets preferably face the traction wheel and the median portions of the arms engage pivot members which constitute or form part of the first abutment means and are mounted in the frame to be engaged or closely approached by the median portions of the arms in the first position or positions of the support. The biasing means preferably includes bolts, studs or other suitable pressure transmitting elements which engage the arms of the support in the proximity of the respective sockets. The pressure transmitting elements of the biasing means and the pivot members of the first abutment means are preferably disposed at the opposite sides of the respective arms.

The arms of the support engage or closely approach the pivot members of the first abutment means in the first position or positions of the support but are disengaged from the respective pivot members when the support is caused to assume its second position or positions. The arrangement is preferably such that the arms are adjacent to but spaced apart from the respective first abutment means in the second position or positions of the support, and the cutting edge of the knife which is carried by the holder of the support is remote from the traction wheel in the second position of the support. The holder is accessible for detachment from the arms of the support in the first position or in one of the first positions of the support. The mode of operation is preferably such that the aforementioned eccentric or eccentrics of the displacing means must be rotated through or close to 90° in order to move the support between the first and second positions.

In accordance with a presently preferred embodiment of the invention, the support is movable between a plurality of first positions in one of which the holder is detachable from the arms and can be removed from the frame. The second abutment means preferably comprises at least one cam (preferably a stationary cam which is removably installed in the frame) and the support comprises one or more rollers or other suitable follower means serving to track the cam or cams in the second position or positions of the support to thereby maintain the cutting edge of the knife which is carried by the holder at any one of a plurality of different distances from the periphery of the traction wheel. The follower means can be mounted on the arms of the support or on the holder; in the latter instance, the holder can comprise two extensions which flank a central knife-carrying portion of the holder and each of which is provided with a roller follower. The aforementioned coupling pins, studs or bolts of the holder are preferably remote from the follower means. At least one spare cam can be provided for use in lieu of the cam which is removably installed in the frame to thus enable the adjusting means to select a different set of second positions for the support, i.e., for the knife with reference to the traction wheel.

The aforementioned pressure transmitting elements of the biasing means are preferably acted upon by coil springs, dished springs or otherwise configurated resilient elements, preferably by packages of dished springs whose bias is preferably adjustable to vary the force with which the knife is urged toward the traction wheel. The pressure transmitting elements preferably act against those portions of the arms which are remote from the respective eccentrics.

The novel features which are considered as characteristic of the invention are set forth in particular in the appended claims. The skinning machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
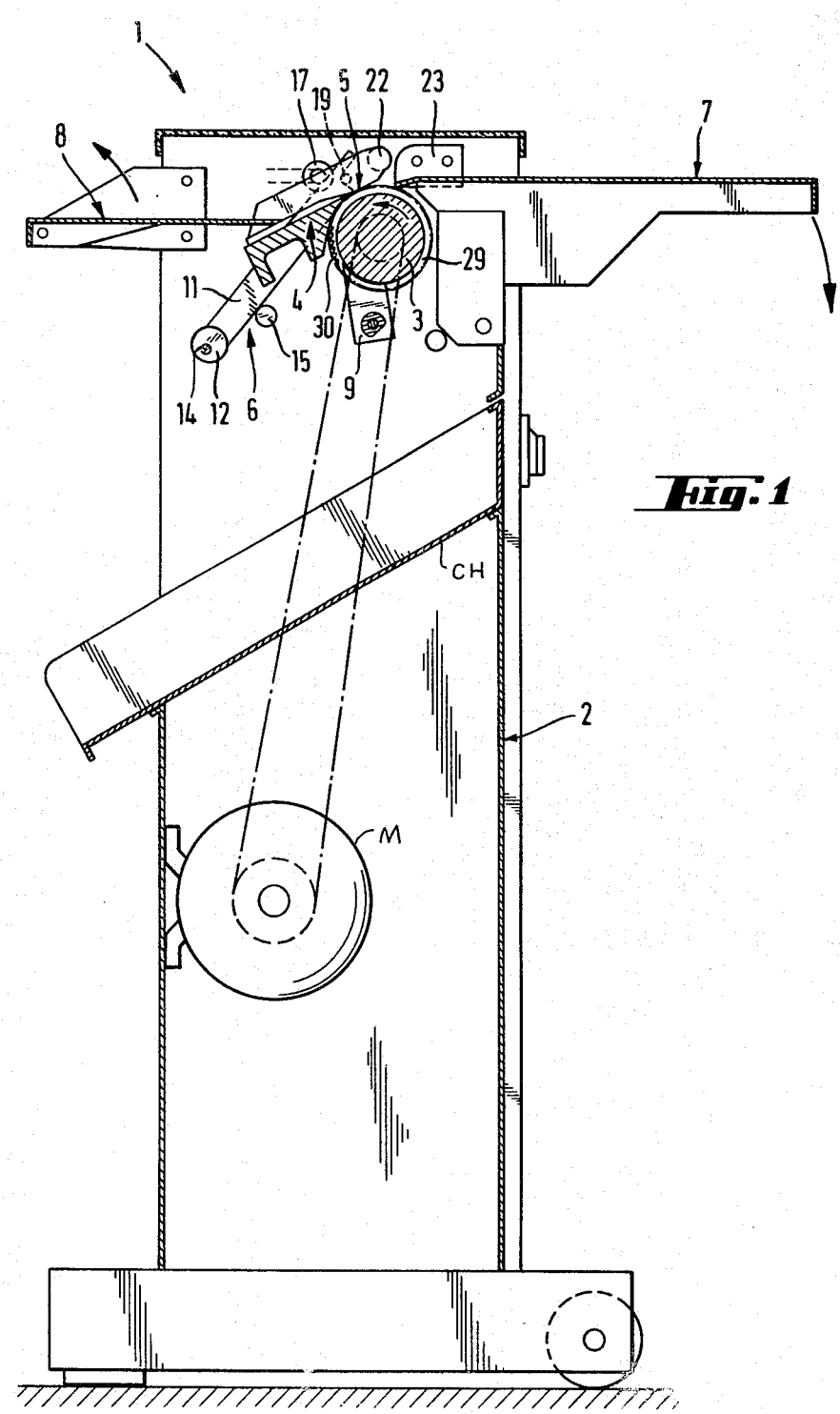
FIG. 1 is a schematic partly elevational and partly vertical sectional view of a slicing or skinning machine which embodies the present invention.
Figure 2:
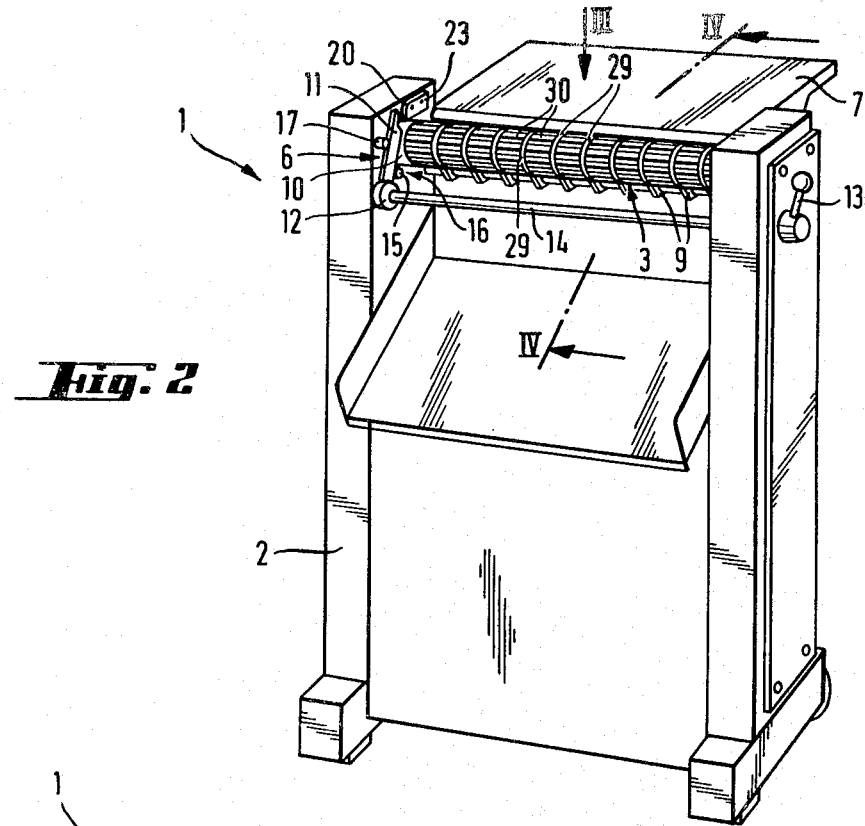
FIG. 2 is a smaller-scale perspective view of the machine, with the knife holder and the means for receiving treated products from the severing or skinning station removed.
Figure 3:
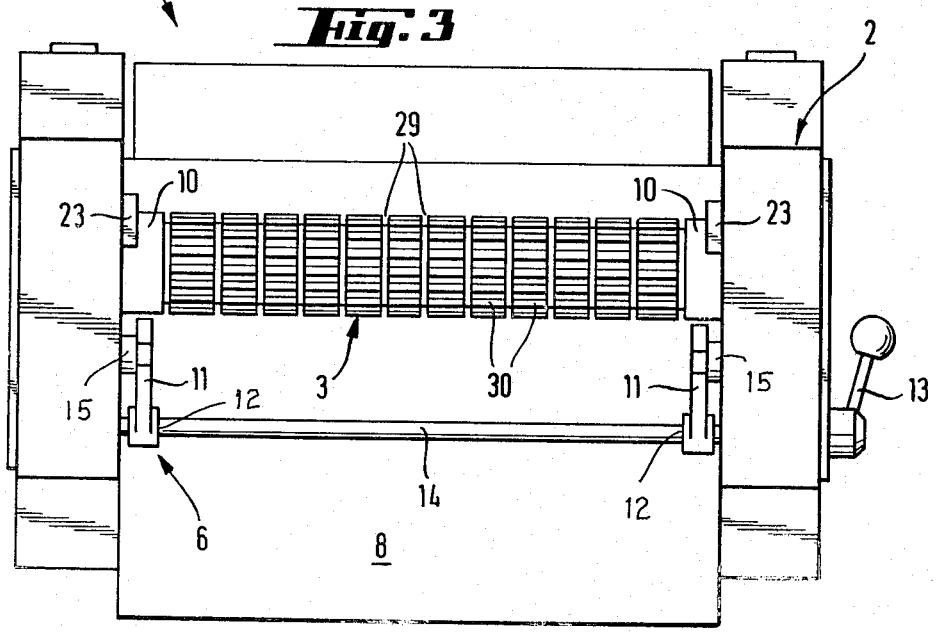
FIG. 3 is a larger-scale plan view of the structure which is shown in FIG. 2 as seen in the direction of arrow III in FIG. 2.

The machine 1 which is shown in FIGS. 1, 2 and 3 comprises an upright frame or housing 2 which may but need not necessarily be mounted on wheels and the upper portion of which carries the mechanism which advances and processes slabs 26 (FIG. 5) of bacon or the like. This mechanism comprises a traction device including a rotary traction wheel 3, a support including a holder 4 for a knife 5 and an adjusting device 6 which can change the position of the holder 4 and its knife 5 with reference to the traction wheel 3. The latter is mounted in the frame 2 adjacent to the inner end of a feeding table 7 the upper side of which serves to support a slab which is in the process of being moved into the range of serrations or teeth 30 (see particularly FIGS. 4, 5 and 6) of the traction wheel 3. This wheel is driven by a motor M which forms part of the traction device and is mounted in the frame 2 at a level below a downwardly sloping chute CH for the rind 25 (see FIG. 5) of a slab 26. The major portion 26a (FIG. 5) of the slab 26 is transferred onto a receiving table or platform 8 which is installed in the frame 2 downstream of the slicing or skinning station accommodating the traction wheel 3 and the knife 5. A stripping device 9 is installed at a level below the traction wheel 3 and serves to separate successive increments of the rind 25 from the teeth 30. To this end, the traction wheel 3 is formed with circumferentially extending grooves 29 for the upper end portions of prongs forming part of the stripping device 9.

The means for yieldably biasing the holder 4 and the knife 5 toward the traction wheel 3 comprises one or more sets of dished springs 24 acting upon the holder 4 through the intermediary of two elongated arms 11 which, together with the holder 4, constitute the aforementioned mobile support for the knife 5. The bias of the springs 24 is sufficiently pronounced to ensure that, when the holder 4 is held in appropriate position and the cutting edge of the knife 5 is in the process of separating the rind 25 from the remaining portion of a slab 26 of bacon or the like, the cutting edge automatically finds an optimum position to slice the slab along the inner side of the rind, i.e., the cutting edge can move nearer to or further away from the periphery of the traction wheel 3. Prior to introduction of a slab into the machine 1, the cutting edge of the knife 5 is maintained at a relatively short distance from the periphery of the traction wheel 3. Such short distance is determined and maintained by two annular stops 10 which are disposed at the axial ends of the traction wheel 3 (see FIGS. 2 and 3) and serve as abutments for the neighboring portions of the holder 4.

Figure 4:
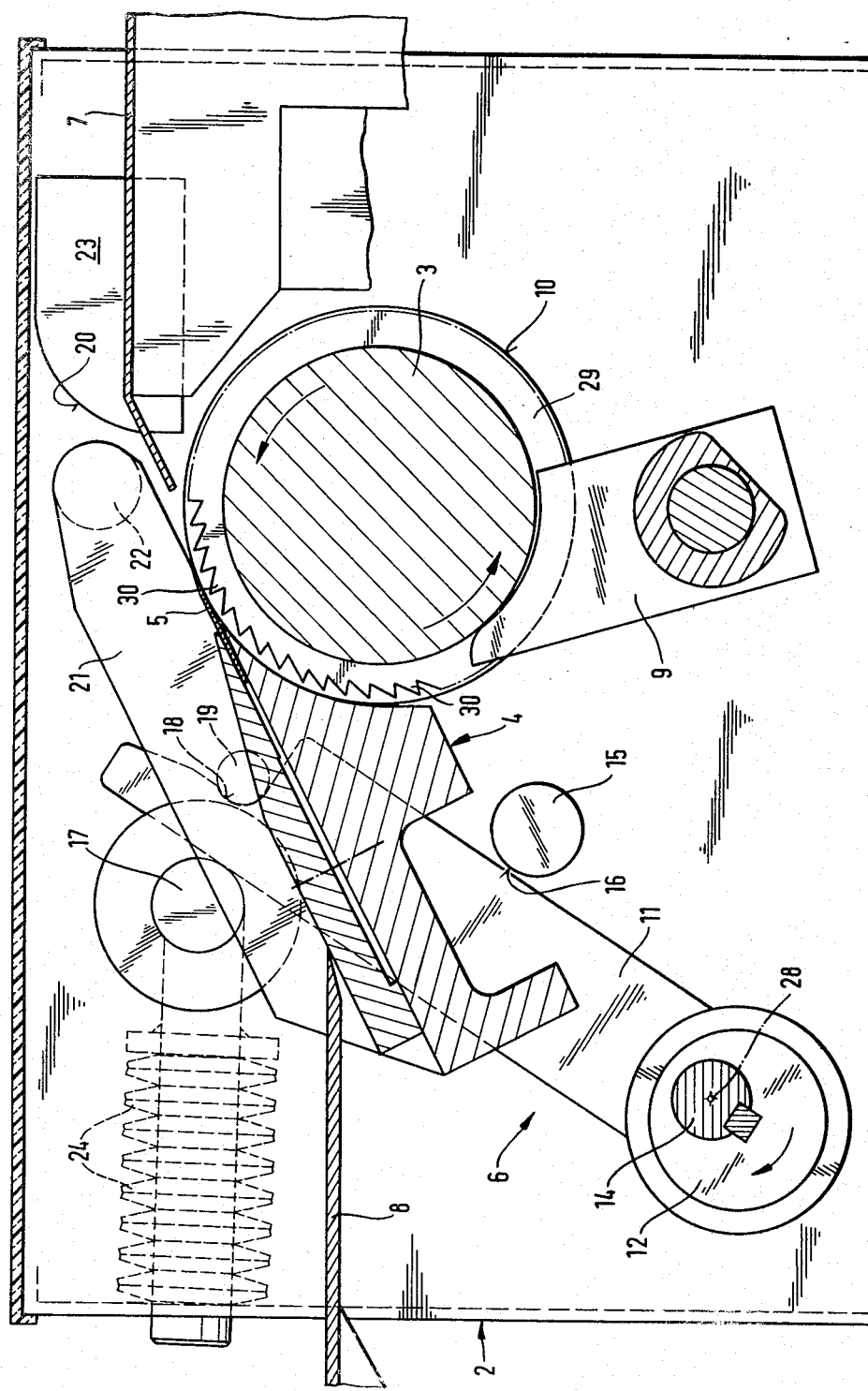
FIG. 4 is a greatly enlarged fragmentary vertical sectional view as seen in the direction of arrows from the line IV—IV of FIG. 2, the knife holder being shown in one of its first positions.

The adjusting device 6 is designed in such a way that it can move the support including the two arms 11 and the holder 4 for the knife 5 to one first position which is shown in FIG. 4 and in which the holder 4 and/or the knife 5 contacts the stops 10, to another first position (FIG. 6) in which the holder 4 can be readily separated from the arms 11, as well as to at least one second position (FIG. 5) in which the knife 5 can move back and forth nearer to or further away from the periphery of the traction wheel 3 as a function of changes in the thickness of the rind 25. At such time, the cutting edge of the knife 5 is located at a variable distance 27 from the adjacent portion of the traction wheel 3.

Figure 5:
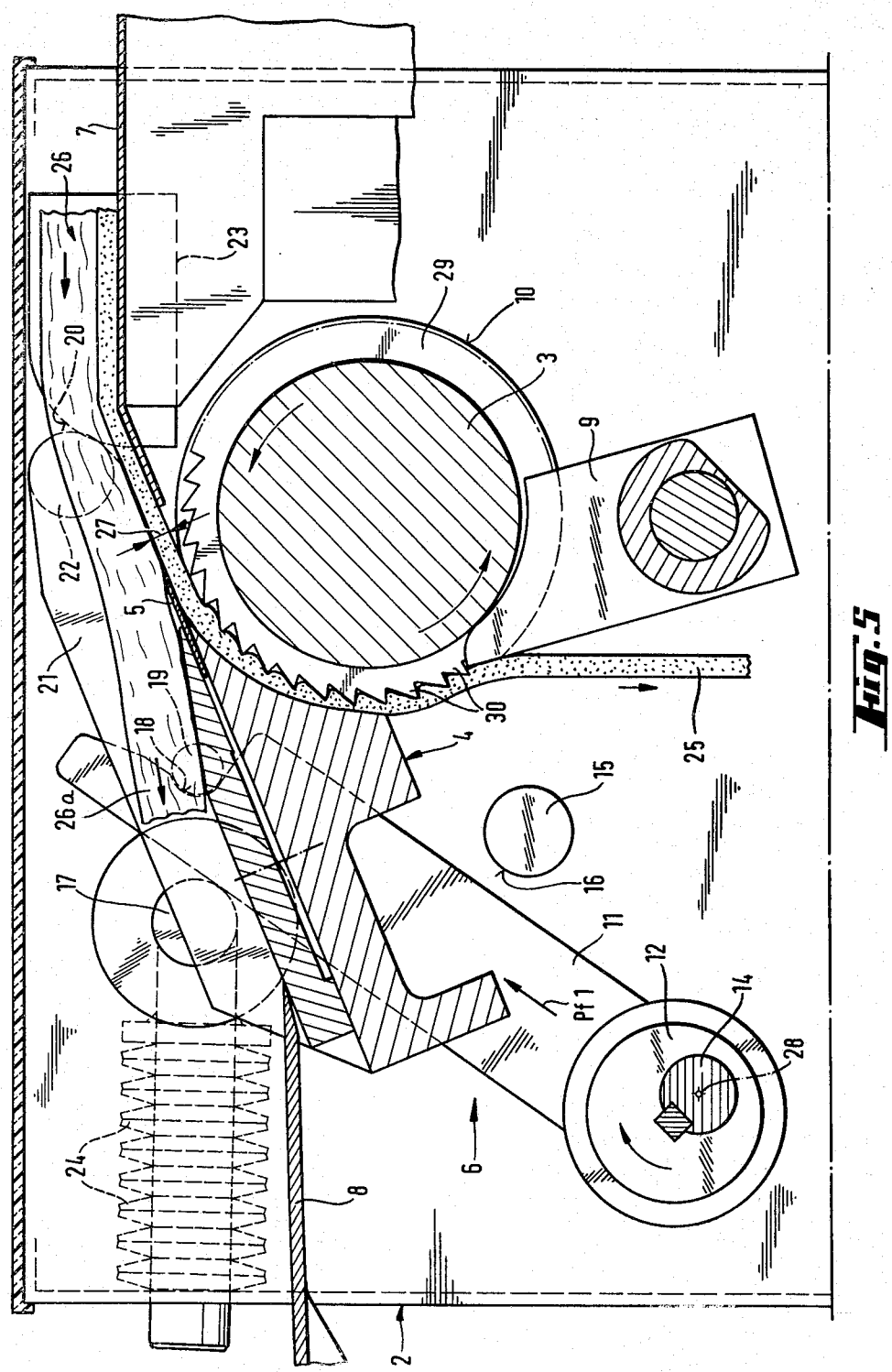
FIG. 5 is a similar fragmentary sectional view but showing the knife holder in a second position.
Figure 6:
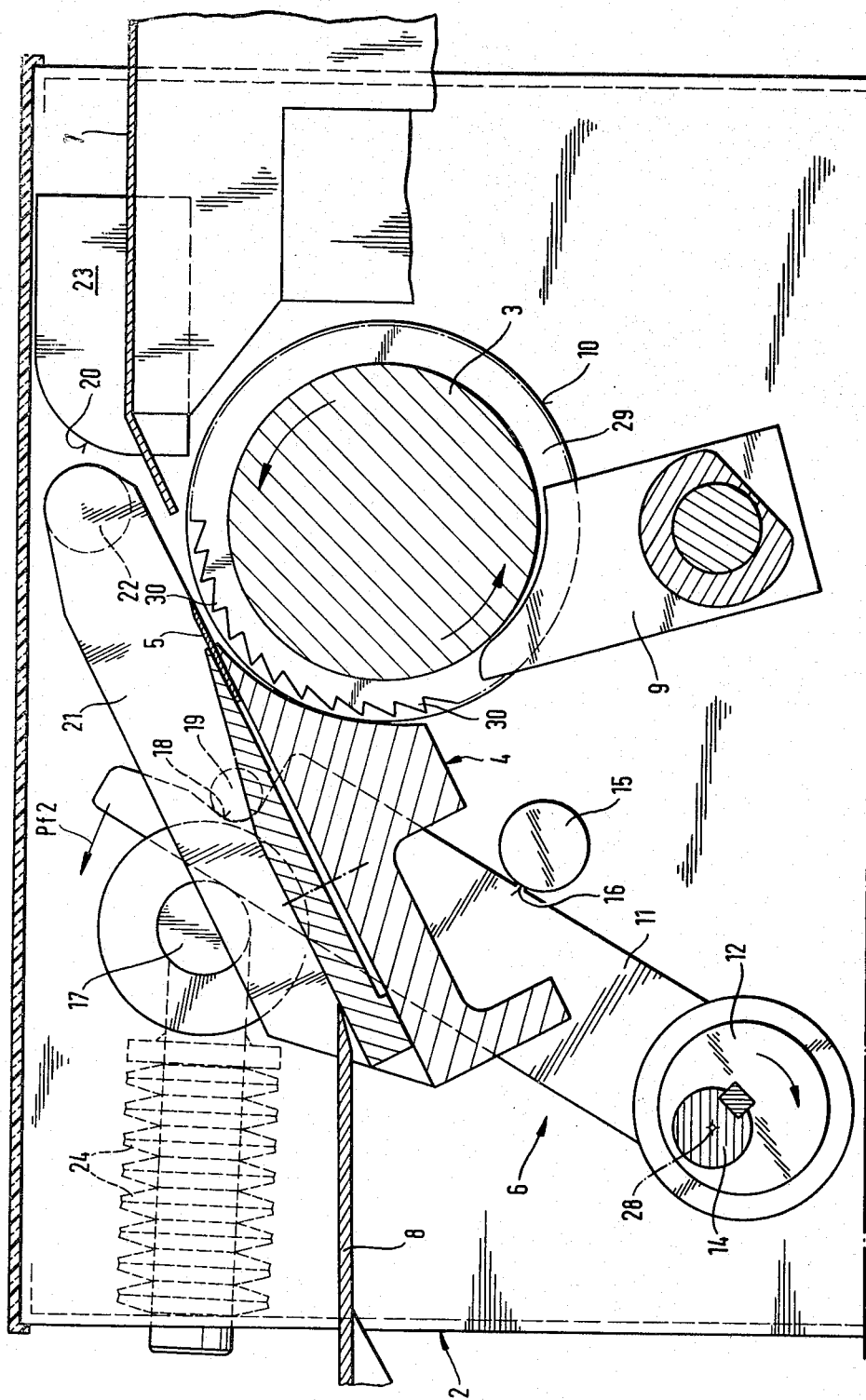
FIG. 6 is a similar fragmentary sectional view but showing the knife holder in another first position in which the knife holder can be withdrawn from the machine.

The details of the adjusting device 6 are best shown in FIGS. 4, 5 and 6. Those component parts of the adjusting device 6 which are shown in FIGS. 4 to 6 are disposed at one axial end of the traction wheel 3, and it is within the purview of the invention to provide a second set of such component parts at the other axial end of the traction wheel. This can be readily seen in FIG. 3 which shows that the adjusting device 6 comprises a horizontal shaft 14 whose axis is or can be parallel to the axis of the traction wheel 3 end which carries two arms 11, one at each axial end of the traction wheel. The arms 11 are movable by the shaft 14 through the medium of discrete coaxial eccentrics 12, and the angular position of the shaft 14 can be changed by a manually operable lever 13 which is accessible at the outer side of the frame 2. If desired, a discrete lever 13 can be provided at each axial end of the shaft 14, and it is also possible to replace such lever or levers by handwheels or other suitable manually actuatable members for rotating the shaft 14 about its axis 28. The eccentrics 12 for the two arms 11 are of identical design and are mounted on the shaft 14 in such a way that each and every angular displacement of the shaft entails identical displacements of the arms 11 with reference to the traction wheel 3 and frame 2. The arrangement is such that the arms 11 are moved lengthwise as well as pivoted in response to rotation of the shaft 14 about its axis 28.

The two sidewalls of the frame 2 carry inwardly extending pivot pins 15 which constitute a first abutment means and can be engaged by the respective arms 11 in a predetermined angular position of the lever 13. That portion of the pivot pin 15 shown in FIGS. 2 and 4 to 6 which can be engaged by the respective arm 11 is indicated by the reference character 16. The dished springs 24 bias pin- or stud-shaped pressure transmitting elements 17 which bear against the adjacent edge faces of the respective arms 11.

The shaft 14 is mounted in the sidewalls of the frame 2 at a level somewhat below and downstream of the traction wheel 3, as considered in the direction of advancement of slabs 26 and their portions 26a from the feeding table 7 to the receiving platform 8. In FIG. 4, the illustrated arm 11 of the support for the knife 4 makes an angle of approximately 35° with a vertical plane including the axis 28 of the shaft 14. Such arm slopes upwardly toward the traction wheel 3 and its upper portion has a socket 18 for a removable coupling bolt 19 provided on the adjacent portion of the holder 4. The socket 18 is disposed at or close to the level of the apex of the traction wheel 3. It can be said that the arms 11 extend substantially tangentially of but are somewhat spaced apart from the periphery of the traction wheel 3 when the shaft 14 assumes the angular position of FIG. 4, i.e., when the support including the arms 11 and the holder 4 for the knife 5 is held in a starting (one first) position. The pivot pins 15 are closely adjacent to but need not necessarily contact the adjacent edge faces of the respective arms 11 because the angular positions of the arms are already determined due to the fact that the end portions of the holder 4 engage the corresponding annular stops 10 on the traction wheel 3. The pressure transmitting elements 17 bear against the adjacent edge faces of the respective arms 11 at the general level of the sockets 18 and coupling bolts 19.

FIGS. 4 and 5 show that the arms 11 need not or do not abut against the respective pivot pins 15 in the starting position of the support as well as in that second position of the support in which the knife 5 separates the rind 25 from the remaining major portions 26a of a slab 26. If the lever 13 is actuated to move the shaft 14 to the angular position of FIG. 6, the eccentrics 12 allow the corresponding arms 11 to engage the portions 16 of the respective pivot pins 15 under the action of the dished springs 24. The pivot pins 15 then constitute fulcra about which the arms 11 pivot during a certain stage of angular movement of the shaft 14 to and from the angular position of FIG. 6. While the shaft 14 moves toward the angular position of FIG. 6, the arms 11 are caused to pivot (at 16) in a counterclockwise direction (note the arrow Pf2 in FIG. 6) and to stress the respective packages of dished springs 24, i.e., to move the pressure transmitting elements 17 in a direction to the left, as viewed in FIGS. 4 to 6. The holder 4 is moved away from the traction wheel 3 and can be withdrawn from the frame 2 by moving upwardly and to the right, as viewed in FIG. 6. When the holder 4 is reinserted or replaced by another holder, the shaft 14 is rotated again to move to the angular position of FIG. 4 corresponding to the starting (one first) position of the support including the arms 11 and the holder 4. In the illustrated embodiment, the shaft 14 is rotated clockwise through an angle of approximately or exactly 90° in order to move the holder 4 from the position of FIG. 6 to the position of FIG. 4.

Further angular displacement of the shaft 14 in a clockwise direction, as viewed in FIG. 4, results in a movement of the holder 4 and its knife 5 to the second position which is shown in FIG. 5. Such angular displacement of the shaft 14 through the medium of the lever 13 entails a certain longitudinal displacement of the arms 11 and the extent of such displacement is determined by the throw of the two eccentrics 12. The direction of the just mentioned lengthwise movement of the arms 11 is indicated by the arrow Pf1 which is shown in FIG. 5. During movement from the position of FIG. 4 to the position of FIG. 5, a preferably cylindrical follower 22 on an extension 21 of the holder 4 engages and moves along the convex face 20 of a stationary cam 23 which constitutes a component of a second abutment means and is preferably removably mounted in the frame 2. It is preferred to employ two cams 23 (see FIG. 3), one adjacent to the inner side of each of the two sidewalls of the frame 2. The followers 22 cooperate with the respective cams 23 to move the cutting edge of the knife 5 away from the periphery of the traction wheel 3. The followers 22 (e.g., in the form of rollers) are mounted at the upper ends of the respective extensions 21 (i.e., at those ends of the extensions which are remote from the corresponding sockets 18). The extensions 21 carry the respective followers 22 at a level above the cutting edge of the knife 5. This contributes to more satisfactory lever arms of the holder 4. The cams 23 are preferably removably secured to stationary carriers in the frame 2 so that they can be replaced by differently configured cams if the nature of the material to be treated is such that the width of the gap 27 between the knife 5 and the traction wheel 3 should deviate from that which is shown in FIG. 5.

It will be noted that a single lever 13 suffices to effect the movement of the holder 4 to any one of the positions shown in FIGS. 4 to 6 by the simple expedient of rotating the shaft 14 through angles of 90° or a multiple of 90°. As indicated by the arrows, the arrangement may be such that the lever 13 must turn the shaft 14 clockwise (as viewed in FIG. 6) through 90° in order to move the holder 4 from one first position (ready for removal) to another first position which is shown in FIG. 4, that a clockwise angular displacement through 90° is required to move the holder 4 from the (first) position of FIG. 4 to the (second) position of FIG. 5, and that a further clockwise angular movement (through 180°) is necessary to move the holder 4 from the (second) position of FIG. 5 to the (first) position of FIG. 6. The operator can readily memorize those (three) angular positions of the lever 13 which are required to maintain the holder 4 in the position of FIG. 4, 5 or 6, and the provision of a single lever 13 reduces the likelihood of improper manipulation because this lever initiates the movement of the holder 4 to each and every one of the various positions. This simplifies the manipulation and reduces the likelihood of improper positioning of the knife 5.

As mentioned above, the stationary cams (23) are separably affixed to the respective carriers of the frame 2. It is equally possible to fixedly mount the cams 23 on the respective carriers and to adjustably or removably install the carriers in the frame 2. The illustrated biasing means including the parts 17 and 24 can be replaced by biasing means employing coil springs or other resilient elements without departing from the spirit of the invention. It is preferred to mount the biasing means in such a way that the bias upon the arms 11 can be regulated, e.g., by increasing or reducing the number of dished springs 24 in the respective packages or by changing the positions of retainers for such springs. Still further, the followers 22 can be replaced by followers which are mounted directly on the respective arms 11; this can be accomplished by providing the arms 11 with integral or separable extensions which carry the followers and whose length suffices to ensure that the followers can track the faces 20 of the respective cams 23 while the shaft 14 is caused to move from the angular position of FIG. 4 to that of FIG. 5.

The adjusting device 6 can be said to include a displacing unit (comprised of the shaft 14 and the two eccentrics 12), first abutment means (the two pivot pins 15) which is engaged or closely approached by the arms 11 of the support for the knife 5 in the first positions (FIGS. 4 and 6) of the support, second abutment means (cams 23) which is engaged by the followers 22 of the support in the second position (FIG. 5) of the support, and a member (lever 13) which serves to actuate the displacing unit, i.e., to turn the shaft 14 of the displacing unit about the axis 28.

The operation of the machine 1 is as follows:

It is assumed that the lever 13 maintains the shaft 14 in the angular position of FIG. 6. In such position of the shaft 14, an attendant inserts the holder 4 into the machine so that the coupling bolts 19 of the holder enter the sockets 18 of the respective arms 11. The lever 13 is then pivoted through 90° in a clockwise direction, as viewed in FIG. 6, to assume the angular position of FIG. 4. This entails some longitudinal movement and simultaneous pivoting of the arms 11 about the respective pivot pins 15. In the position of FIG. 4, the end portions of the holder 4 (or suitable members mounted on the holder 4) engage the respective annular stops 10 of the traction wheel 3 and the knife 5 assumes its normal starting position. Further rotation of the shaft 14 in a clockwise direction, as viewed in FIG. 4, results in longitudinal movement of the arms 11 in the direction of arrow Pf1 and the followers 22 are caused to engage the faces 20 of the respective cams 23. If the clockwise rotation of the shaft 14 continues, the followers 22 move along the convex faces 20 of the respective cams 23 and cause the cutting edge of the knife 5 to move away from the periphery of the traction wheel 3. The configuration of the convex faces 20 of the cams 23 can be such that the width of the gap 27 between the cutting edge of the knife 5 and the periphery of the traction wheel 3 assumes a maximum value when the shaft 14 is held in the angular position of FIG. 5. In the illustrated embodiment, the width of the gap 27 will increase in response to further clockwise rotation of the shaft 14 beyond the angular position of FIG. 5; the width of the gap 27 will continue to increase in response to a further angular movement of the shaft 14 through 90°, and the width of the gap will thereupon begin to decrease if the shaft 14 continues to rotate in a clockwise direction. The machine 1 can be equipped with suitable detent means which enable the operator to sense that the shaft 14 has assumed one of the three predetermined angular positions. Furthermore, the machine can be provided with suitable stops which prevent the shaft 14 from rotating clockwise beyond the position of FIG. 5; thus, the arrangement may be such that the shaft 14 must be rotated counterclockwise in order to move from the position of FIG. 5 back to the position of FIG. 6. Additional stops can be provided to ensure that the shaft 14 cannot be rotated counterclockwise beyond the angular position of FIG. 6. The two stops or sets of stops thus confine the shaft 14 to angular movements in a clockwise direction from the position of FIG. 6, through the position of FIG. 4 and to the position of FIG. 5, and in a counterclockwise direction from the position of FIG. 5 back to the position of FIG. 6.

An important advantage of the improved machine is that the adjusting device 6 is simple, compact and inexpensive. Furthermore, the support for the knife 5 is also simple, compact and of lightweight design so that it can be readily adjusted by rotating the lever 13 of the adjusting device 6. The knife 5 is installed in the central protion of the holder 4, and such central portion is flanked by the two extensions 21 carrying the roller followers 22 at the ends which are remote from the respective sockets 18, coupling bolts 19 and pressure transmitting elements 17. The sockets 18 of the arms 11 face the wheel 3, each pivot pin 15 is disposed at one side of the respective arm 11, and each pressure transmitting element 17 bears against the other side of the respective arm 11, i.e., the pivot pins 15 and the elements 17 are disposed at the opposite sides of the respective arms 11. The pivot pins 15 are engaged or can be engaged by the median portions of the respective arms 11 and the coupling bolts 19 as well as the pressure transmitting elements 17 engage those end protions of the arms which are remote from the respective eccentrics 12. The just described mode of mounting the arms, pivoting the arms, coupling the arms to the holder 4, and biasing the arms allows for the establishment of highly satisfactory lever arms and, moreover, the mechanism which supports and adjusts the knife 5 with reference to the wheel 3 is surprisingly compact, particularly as regards its height. The height of such mechanism is determined primarily by the combined length of the arms 11 and the holder 4, i.e., by the length of the support for the knife 5 (as considered radially of the shaft 14).

It is already known to provide a bacon slicing or skinning machine with a mechanism which can move the knife to a position that can be said to correspond to the second position (FIG. 5) of the knife 5 in the machine of the present invention. However, such movability of the knife in conventional machines is achieved by resorting to a separate lever or a like member which can transmit motion to the knife holder through the medium of a discrete motion transmitting device other than that which supports the knife holder. The additional lever contributes to complexity of the conventional machines, and the additional motion transmitting means contribute to higher initial and maintenance cost. In the machine of the present invention, a single lever (13) suffices to move the knife 5 to any one of the aforedescribed positions, and all movements are effected by way of one and the same group of elements (namely, the arms 11 and the holder 4). All that is necessary to move the knife 5 to a selected second position (FIG. 5 is to provide the second abutment means (cam or cams 23). Such abutment means can be fixedly mounted in the frame 2, the same as the first abutment means 15, because the support is movable with reference to each of these abutment means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine for skinning bacon or analogous products, comprising a frame; a support mounted in said frame and including a knife holder and at least one arm supporting said holder; a traction device movably mounted in said frame and arranged to advance products into the range of the knife which is carried by said holder; means for adjusting the position of said support with reference to said traction device including first and second abutment means provided in said frame and displacing means actuatable to move said support with reference to said frame between at least one first position in which said support engages or is close to said first abutment means and at least one second position in which said support engages said second abutment means, said displacing means including at least one eccentric which is rotatable relative to said frame to thereby move said holder to said first and second positions, said first abutment means comprising a pivot member for said arm and said arm being pivotable with reference to said pivot member in the first position of said support and said holder being accessible for detachment from said arm in such first position of said support, said second abutment means comprising at least one cam and said support further including follower means arranged to track said cam in the second position of said support to thereby maintain the knife which is carried by said holder at any one of a plurality of different distances from said traction device; and means for yieldably biasing the knife in said holder toward said traction device through the medium of said support.

2. The machine of claim 1, wherein said adjusting means further comprises a member which is turnable with reference to said frame to thereby acutate said displacing means.

3. The machine of claim 1, wherein said arm is movable lengthwise and is pivotable with reference to said first abutment means in response to actuation of said displacing means.

4. The machine of claim 1, wherein said support includes several arms detachably supporting said holder.

5. The machine of claim 4, wherein said displacing means includes an eccentric for each of said arms and said adjusting means further comprises a manually operable lever mounted in said frame and arranged to rotate said eccentrics about a common axis.

6. The machine of claim 4, wherein said traction device includes a wheel and means for rotating said wheel relative to said frame, said arms being disposed substantially tangentially of and having portions adjacent to said wheel, said portions of said arms having sockets and said holder having male coupling members detachably received in the sockets of said arms.

7. The machine of claim 6, wherein said sockets face said wheel.

8. The machine of claim 6, wherein said arms have median portions and said first abutment means comprises a pivot member for each of said arms, said pivot members being mounted in said frame and being engaged by the median portions of the respective arms in the first position of said support.

9. The machine of claim 8, wherein said biasing means includes pressure transmitting elements engaging said arms in the proximity of the respective sockets.

10. The machine of claim 9, wherein said pressure transmitting elements and said pivot members are disposed at the opposite sides of the respective arms.

11. The machine of claim 1, wherein said arm engages said first abutment means in the first position and is disengaged from said first abutment means in the second position of said support.

12. The machine of claim 11, wherein said arm is closely adjacent to said pivot member while said follow means engages said second cam, the knife in said holder having a cutting edge which is remote from said traction device in the second position of said support.

13. The machine of claim 1, wherein said adjusting means further comprises a manually operable member for rotating said eccentric, said support being movable from said first to said second position in response to rotation of said eccentric through an angle of at least approximately 90°.

14. The machine of claim 1, wherein said support is movable between a plurality of first positions in one of which said holder is removable from said frame.

15. The machine of claim 14, wherein said cam is stationary and is supported by said frame.

16. The machine of claim 14, wherein said follower means is supported by said arm.

17. The machine of claim 14, wherein said follower means is provided on said holder.

18. The machine of claim 17, wherein said holder comprises a central portion which supports the knife and a pair of extensions flanking said central portion, said follower means comprising discrete followers provided on the extensions of said holder and engaging said cam in the second position of said support.

19. The machine of claim 18, wherein said holder further comprises coupling means remote from said followers and detachably secured to said arm.

20. The machine of claim 1, wherein said follower means comprises at least one roller.

21. The machine of claim 1, further comprising at least one spare cam for use in lieu of said first mentioned cam to thereby determine a different second position for said support.

22. The machine of claim 1, wherein said biasing means comprises a pressure transmitting element engaging said arm and resilient means for biasing said element against said arm.

23. The machine of claim 22, wherein said arm comprises a first end portion which is engaged by said displacing means and a second end portion which is engaged by said pressure transmitting element.

24. The machine of claim 22, wherein said resilient means comprises a package of dished springs.

25. The machine of claim 1, wherein said biasing means includes means for urging the knife in said holder toward said traction device with a variable force.

* * * * *